US00RE48362E

(19) United States
(12) Reissued Patent
Paredes

(10) Patent Number: US RE48,362 E
(45) Date of Reissued Patent: Dec. 22, 2020

(54) SECURITY LIGHT

(71) Applicant: HeathCo LLC, Bowling Green, KY (US)

(72) Inventor: Apollo Paul Paredes, Livonia, MI (US)

(73) Assignee: HEATHCO LLC, Bowling Green, KY (US)

(21) Appl. No.: 29/722,732

(22) Filed: Jan. 31, 2020

Related U.S. Patent Documents

Reissue of:
(64) Patent No.: Des. 835,834
Issued: Dec. 11, 2018
Appl. No.: 29/601,833
Filed: Apr. 26, 2017

(51) LOC (12) Cl. ..... 26-99
(52) U.S. Cl.
USPC ..... D26/120
(58) Field of Classification Search
USPC .... D26/24, 51, 61, 63, 65, 72, 80, 118, 120, D26/128

(Continued)

(56) References Cited

U.S. PATENT DOCUMENTS

D264,253 S * 5/1982 Goldschmidt ..... D26/63
4,380,792 A * 4/1983 Terrell ..... F21V 21/30 362/249.1

(Continued)

OTHER PUBLICATIONS

Photograph of product packaging at least as early as Mar. 23, 2017.

*Primary Examiner* — Darlington Ly
(74) *Attorney, Agent, or Firm* — Middleton Reutlinger

(57) CLAIM

The ornamental design for a security light, as shown and described.

DESCRIPTION

[FIG. 1 is a lower perspective view of a first embodiment of a security light showing the new design;]
[FIG. 2 is a rear perspective view of the security light design of FIG. 1;]
[FIG. 3 is a front view of the security light design of FIG. 1;]
[FIG. 4 is a rear view of the security light design of FIG. 1;]
[FIG. 5 is a left side view of the security light design of FIG. 1;]
[FIG. 6 is a right side view of the security light design of FIG. 1;]
[FIG. 7 is a top view of the security light design of FIG. 1; and,]
[FIG. 8 is a bottom view of the security light design of FIG. 1.]
FIG. [1] *9* is a [lower] *bottom* perspective view of a security light showing [the] *my* new design;
FIG. [2] *10* is a rear perspective view [of the security light design of FIG. 1] *thereof*;
FIG. [3] *11* is a front *elevation* view [of the security light design of FIG. 1] *thereof*;
FIG. [4] *12* is a rear *elevation* view [of the security light design of FIG. 1] *thereof*;
FIG. [5] *13* is a left side *elevation* view [of the security light design of FIG. 1] *thereof*;
FIG. [6] *14* is a right side *elevation* view [of the security light design of FIG. 1] *thereof*;
FIG. [7] *15* is a top *plan* view [of the security light design of FIG. 1] *thereof; and,*
FIG. [8] *16* is a bottom *plan* view [of the security light design of FIG. 1] *thereof.*
[FIG. 17 is a lower perspective view of a third embodiment of a security light showing the new design;]
[FIG. 18 is a rear perspective view of the security light design of FIG. 17;]
[FIG. 19 is a front view of the security light design of FIG. 17;]

(Continued)

[AMENDED]

[FIG. 20 is a rear view of the security light design of FIG. 17;]
[FIG. 21 is a left side view of the security light design of FIG. 17;]
[FIG. 22 is a right side view of the security light design of FIG. 17;]
[FIG. 23 is a top view of the security light design of FIG. 17; and,]
[FIG. 24 is a bottom view of the security light design of FIG. 17.]
The broken lines represent unclaimed portions of the security light.

1 Claim, 24 Drawing Sheets

Figure 1:
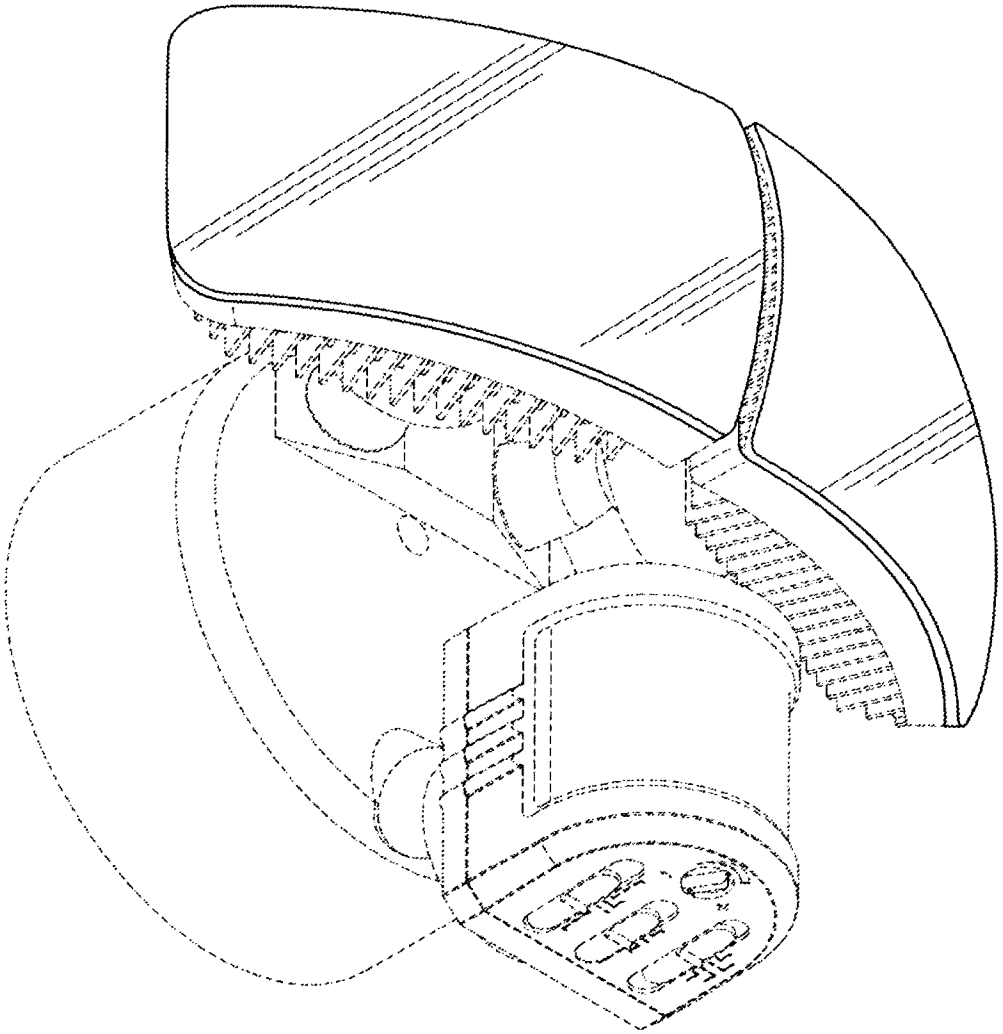
Figure 2:
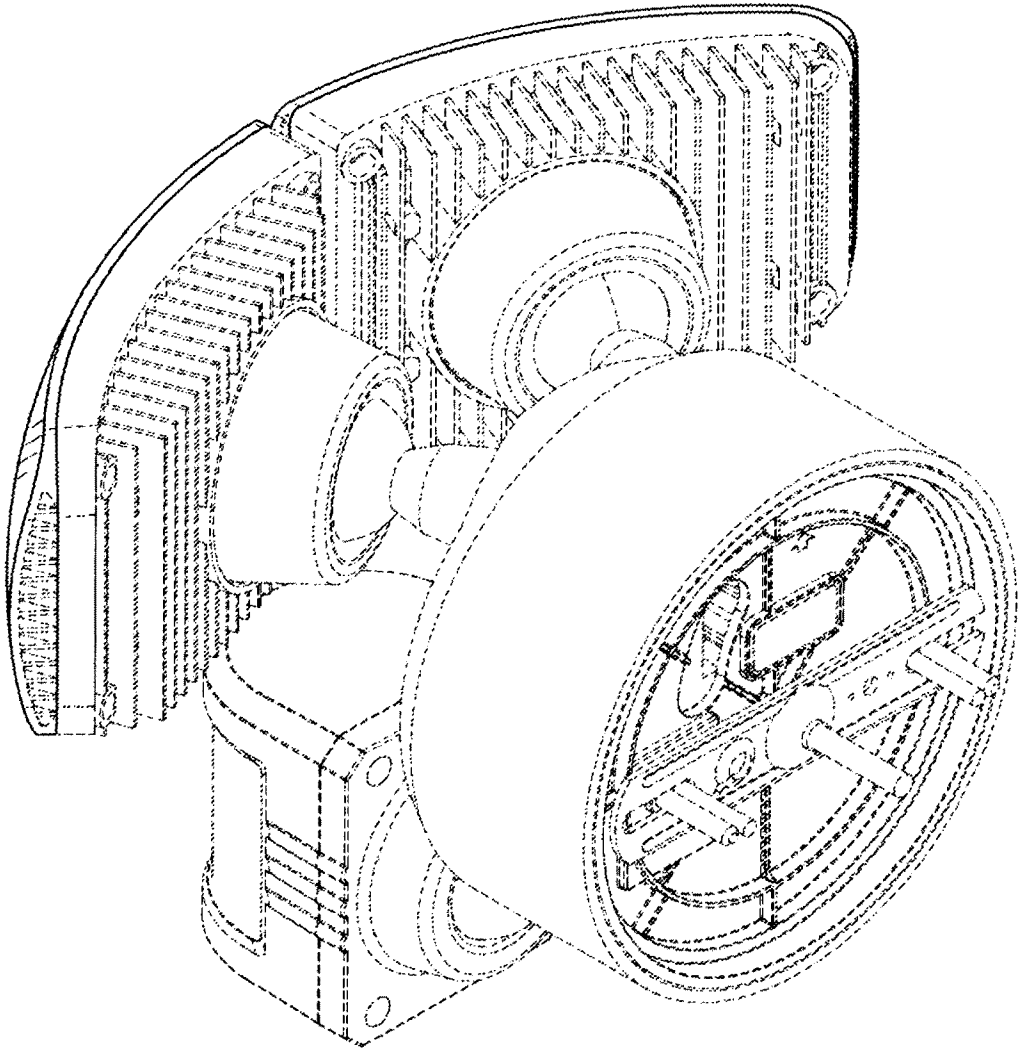
Figure 3:
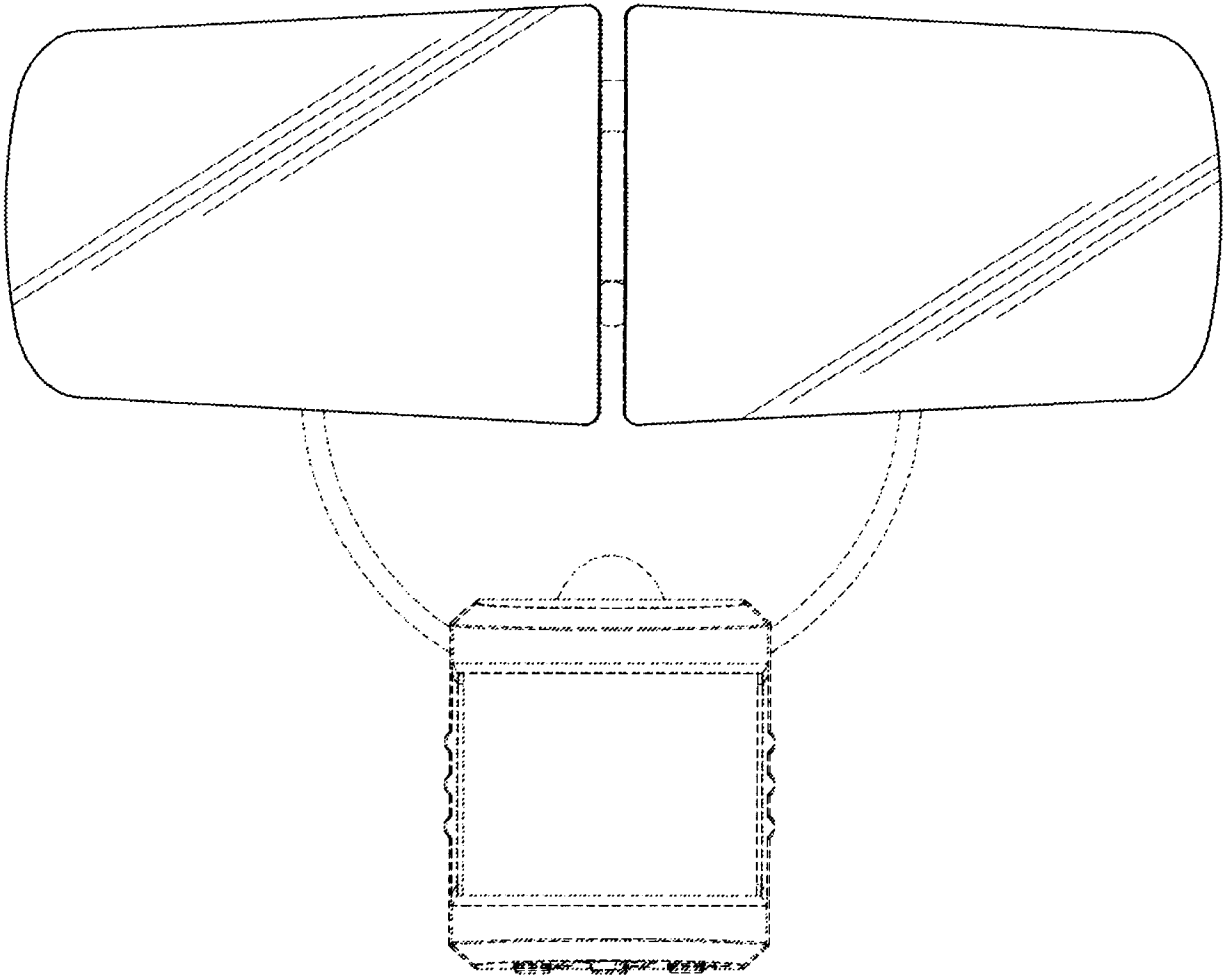
Figure 4:
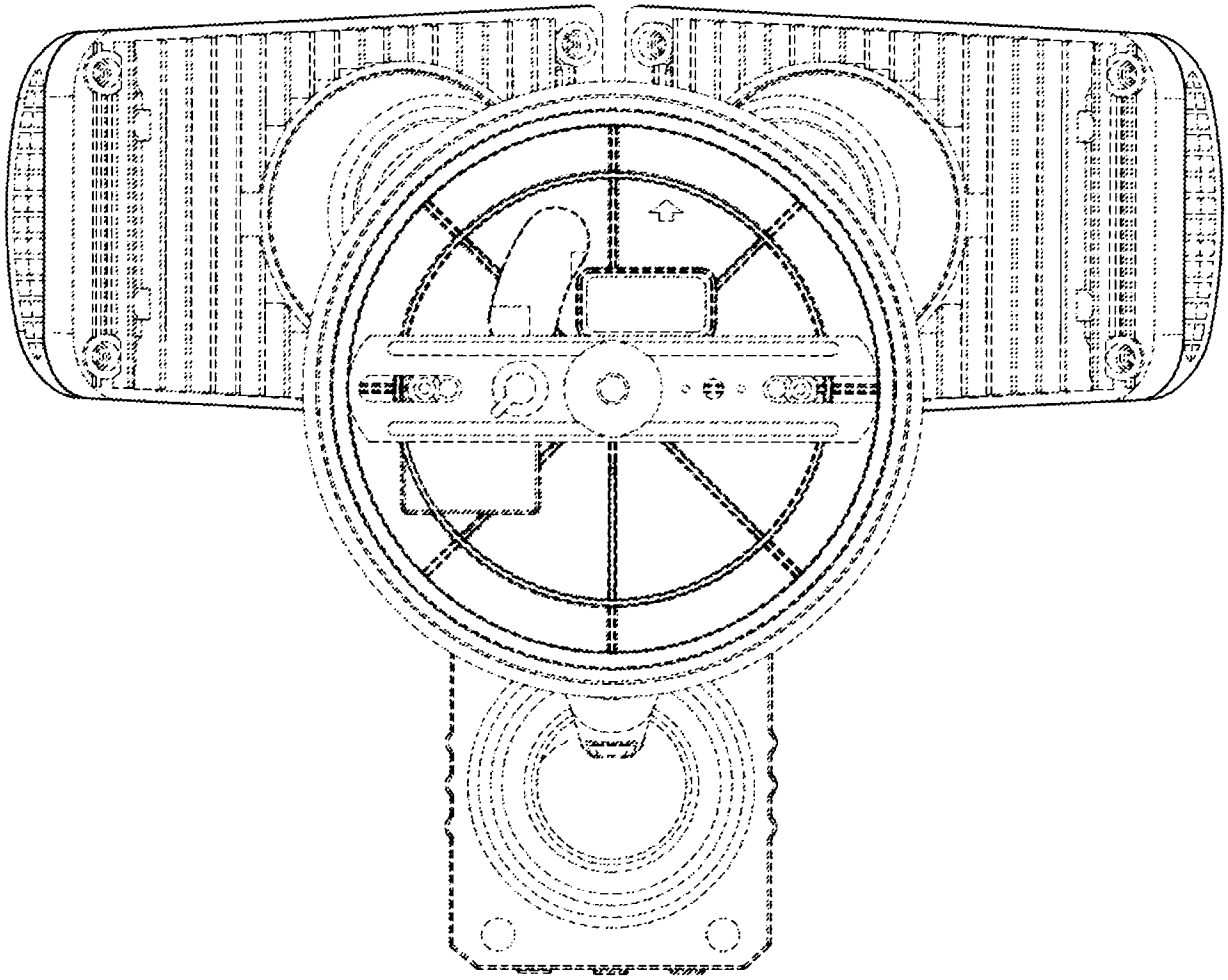
Figure 5:
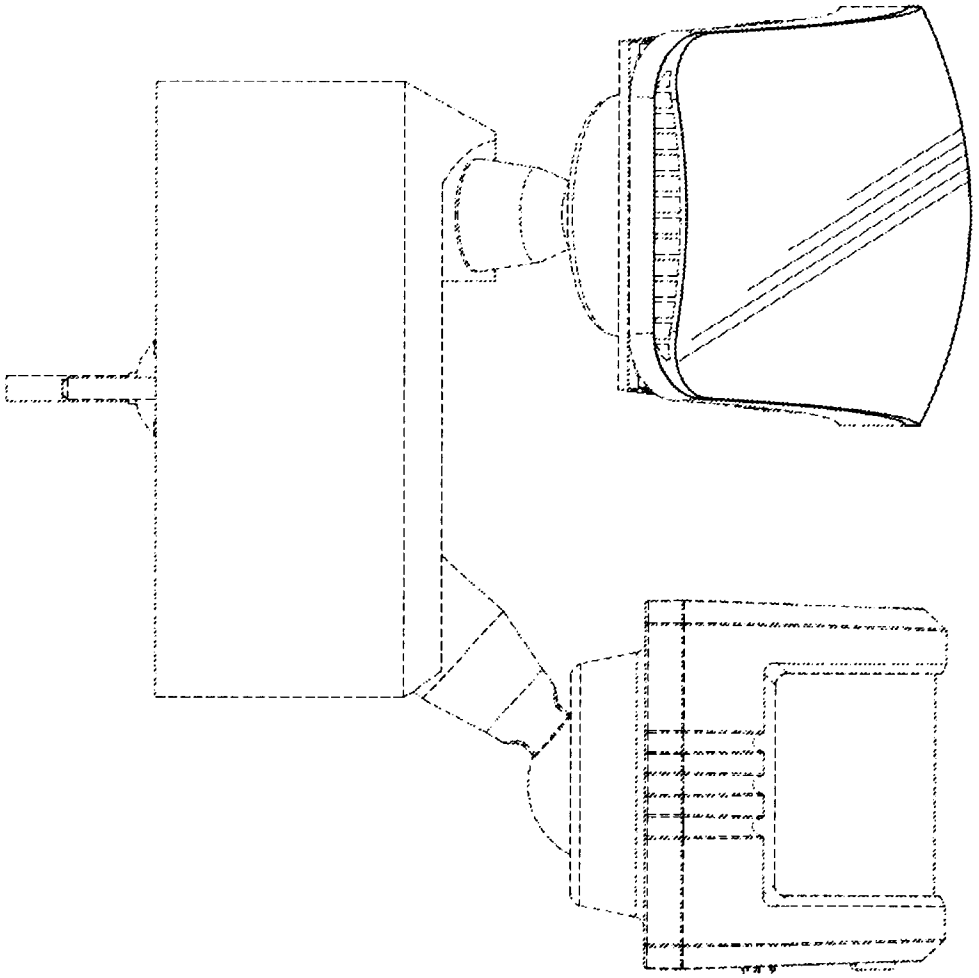
Figure 6:
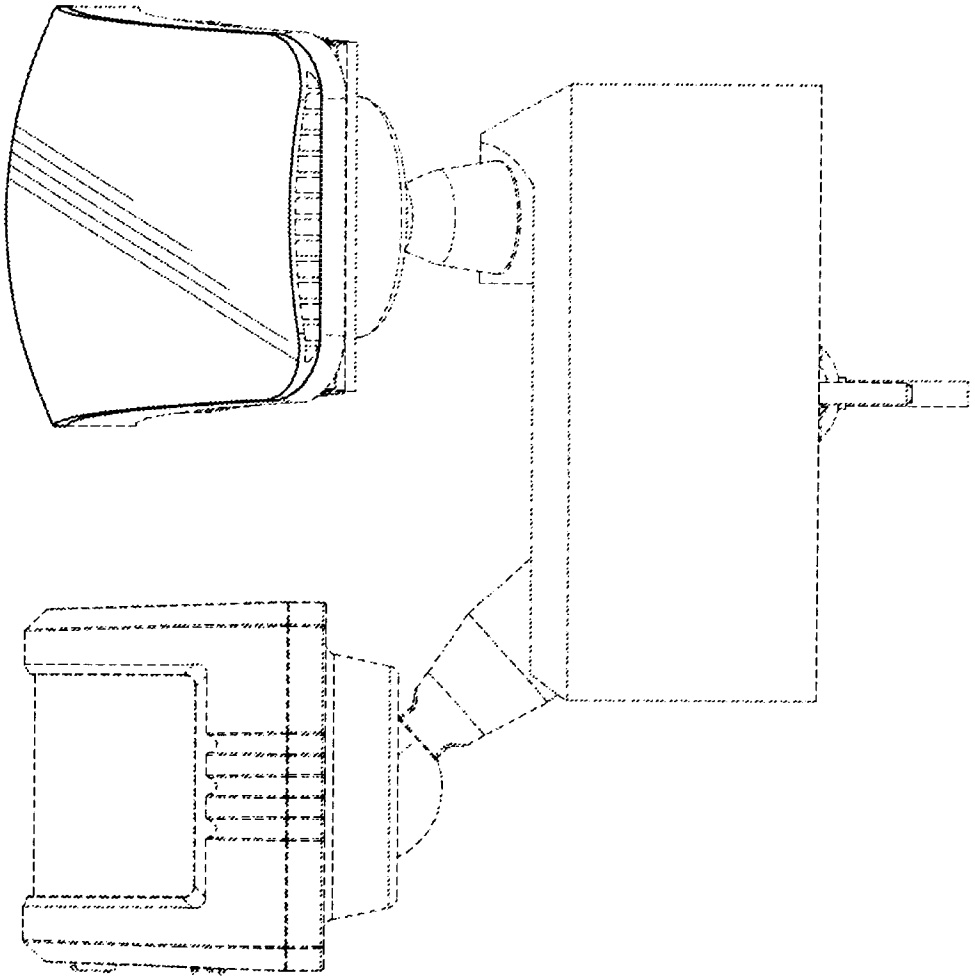
Figure 7:
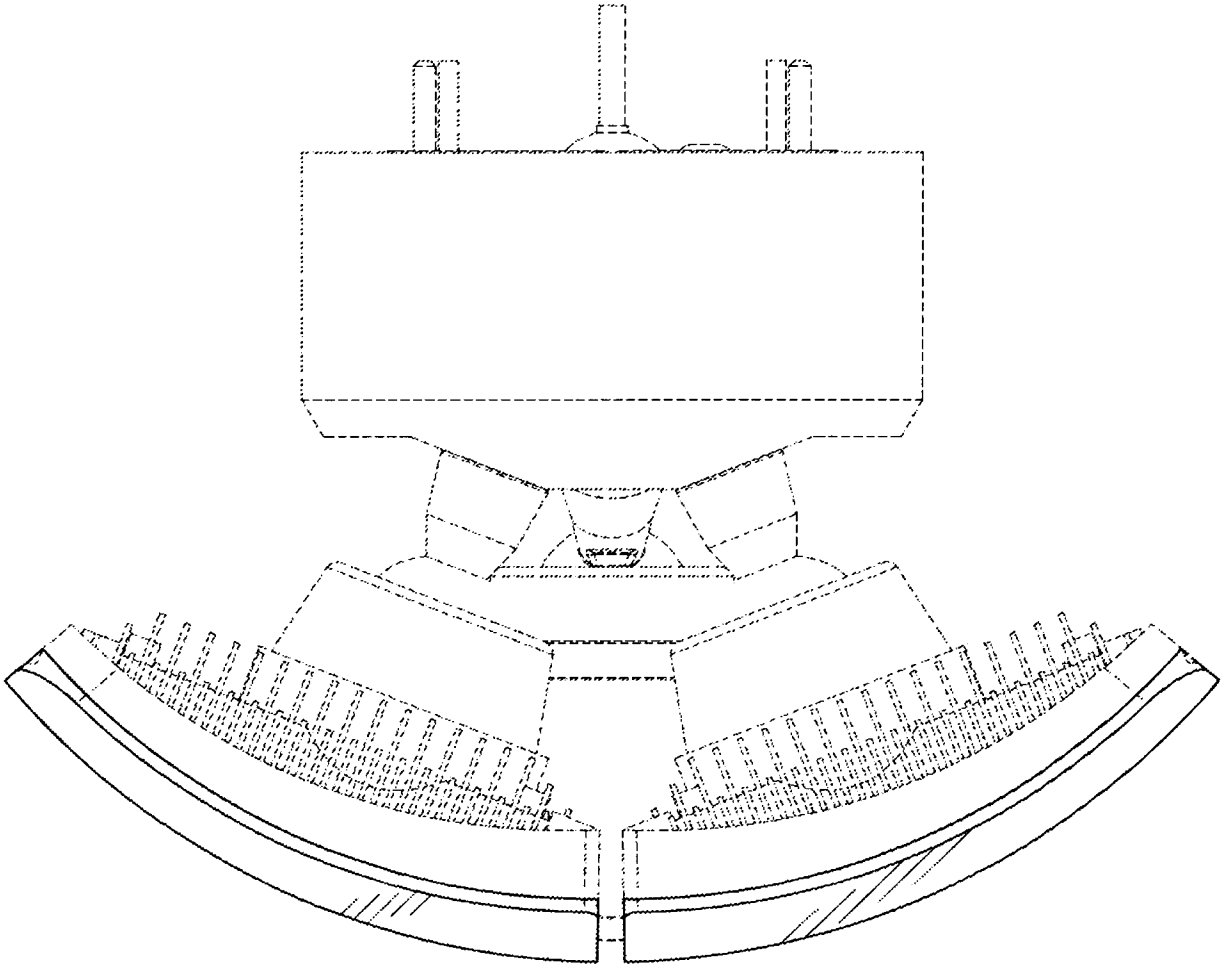
Figure 8:
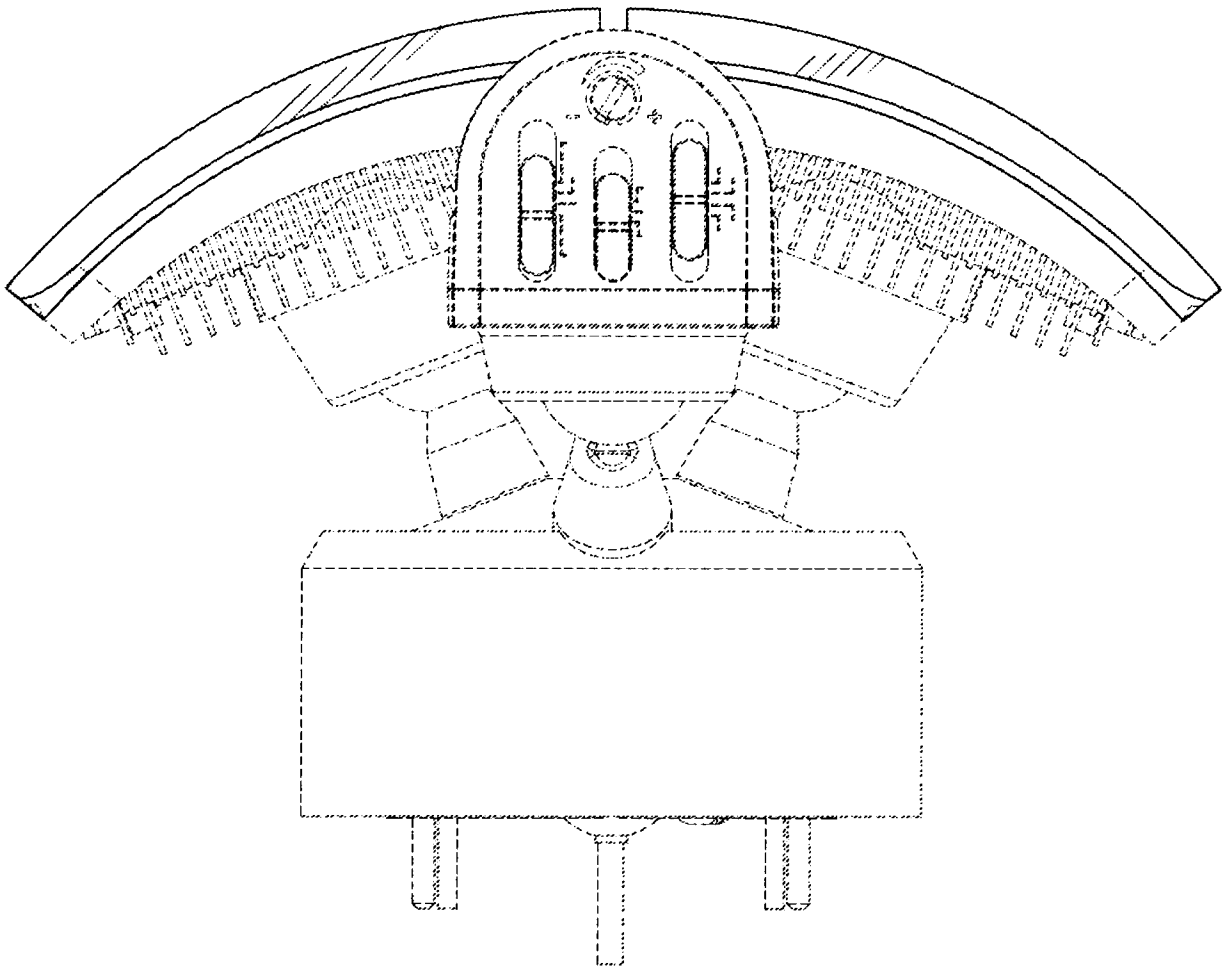
Figure 17:
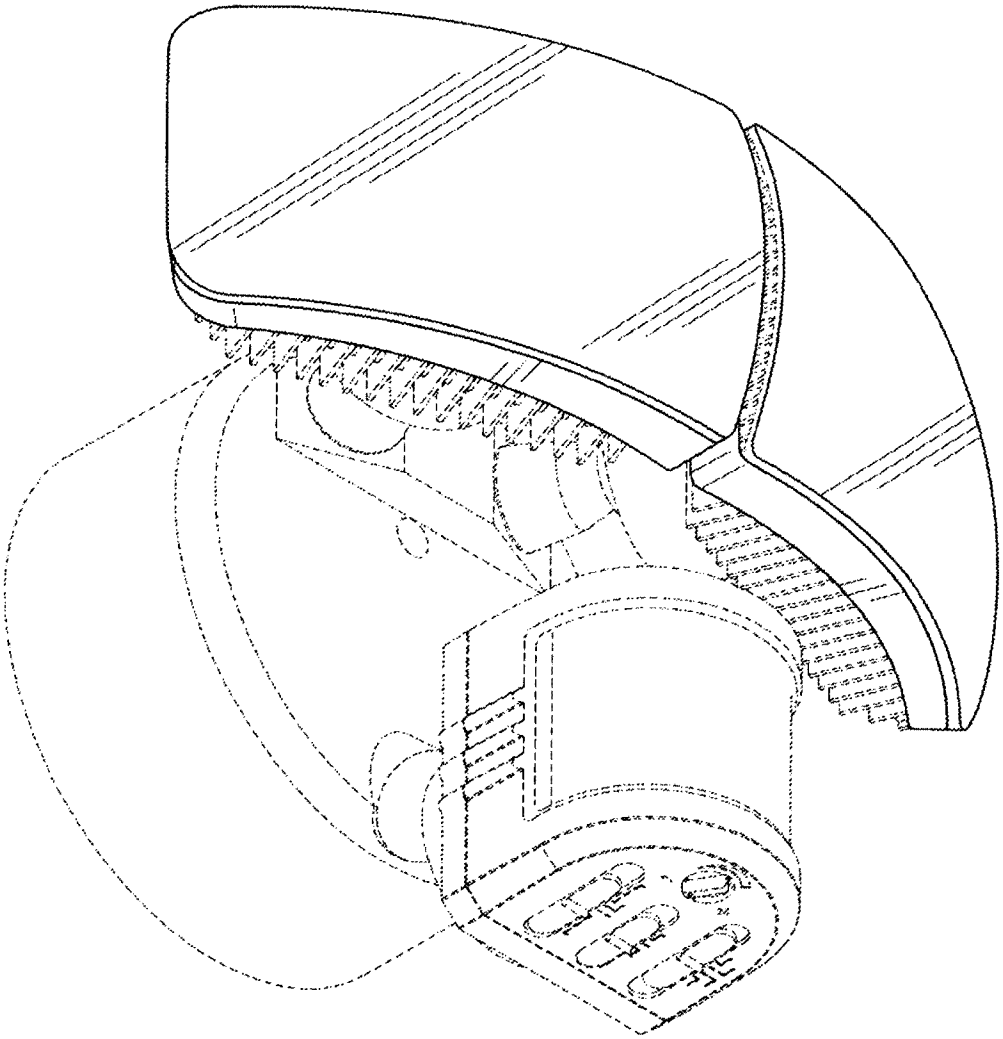
Figure 18:
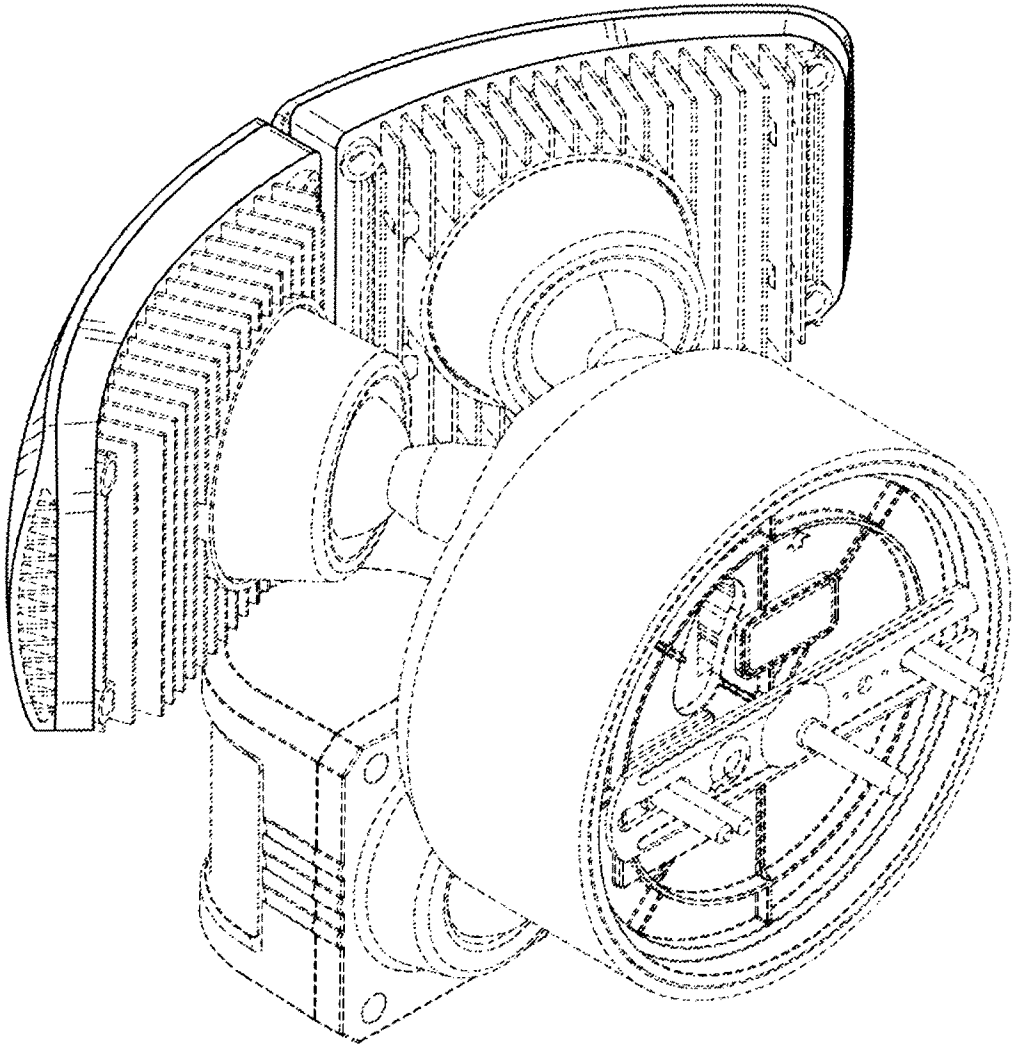
Figure 19:
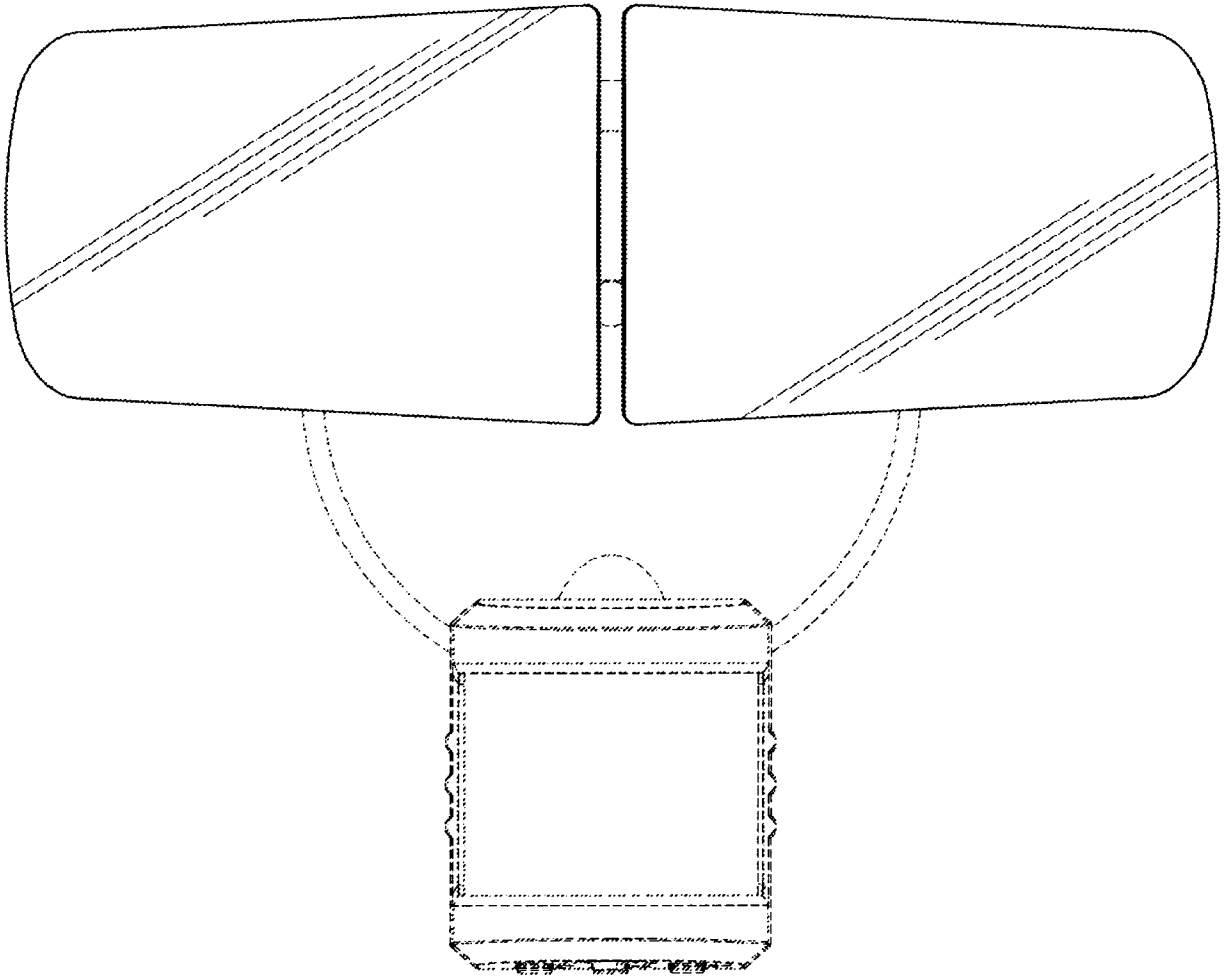
Figure 20:
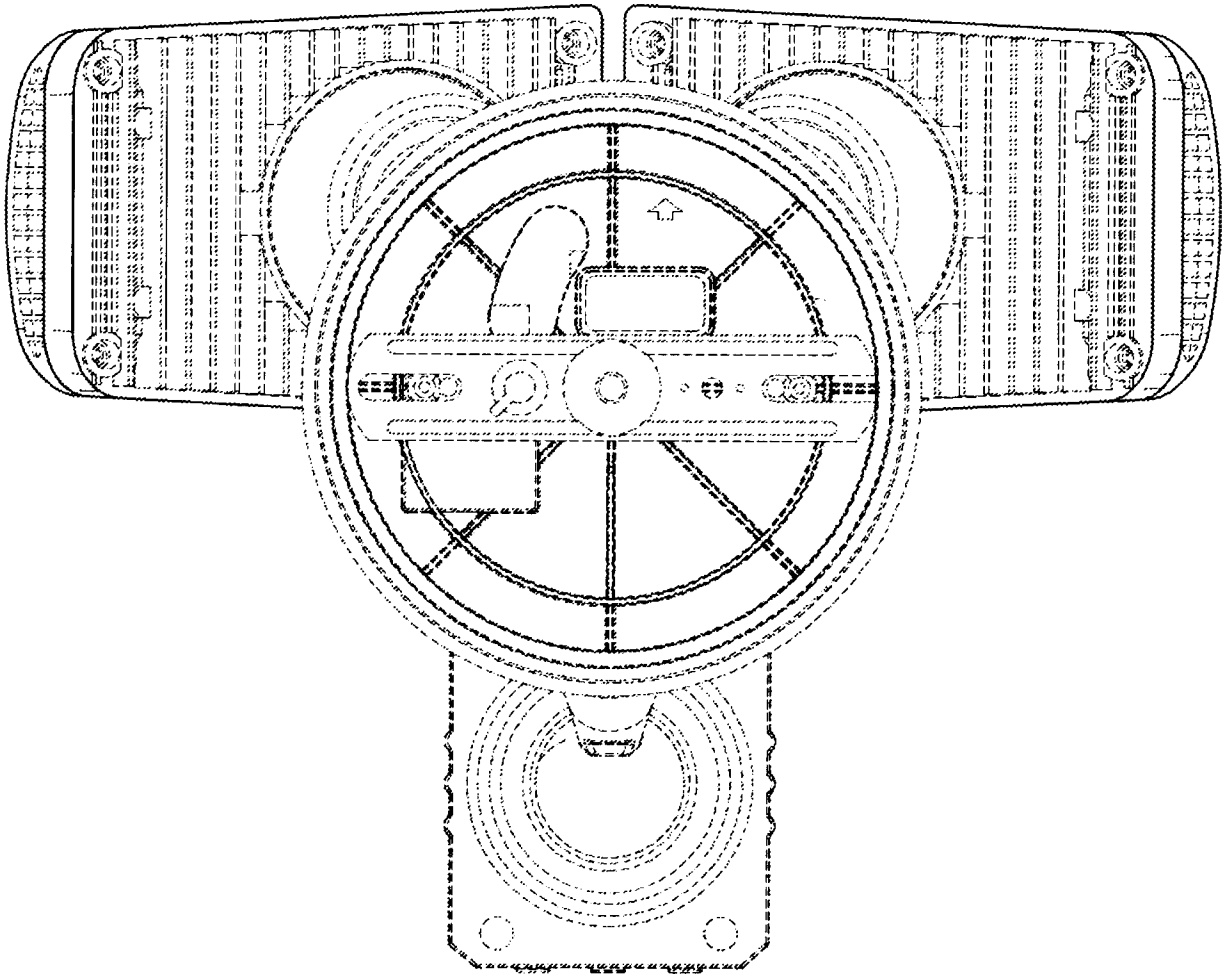
Figure 21:
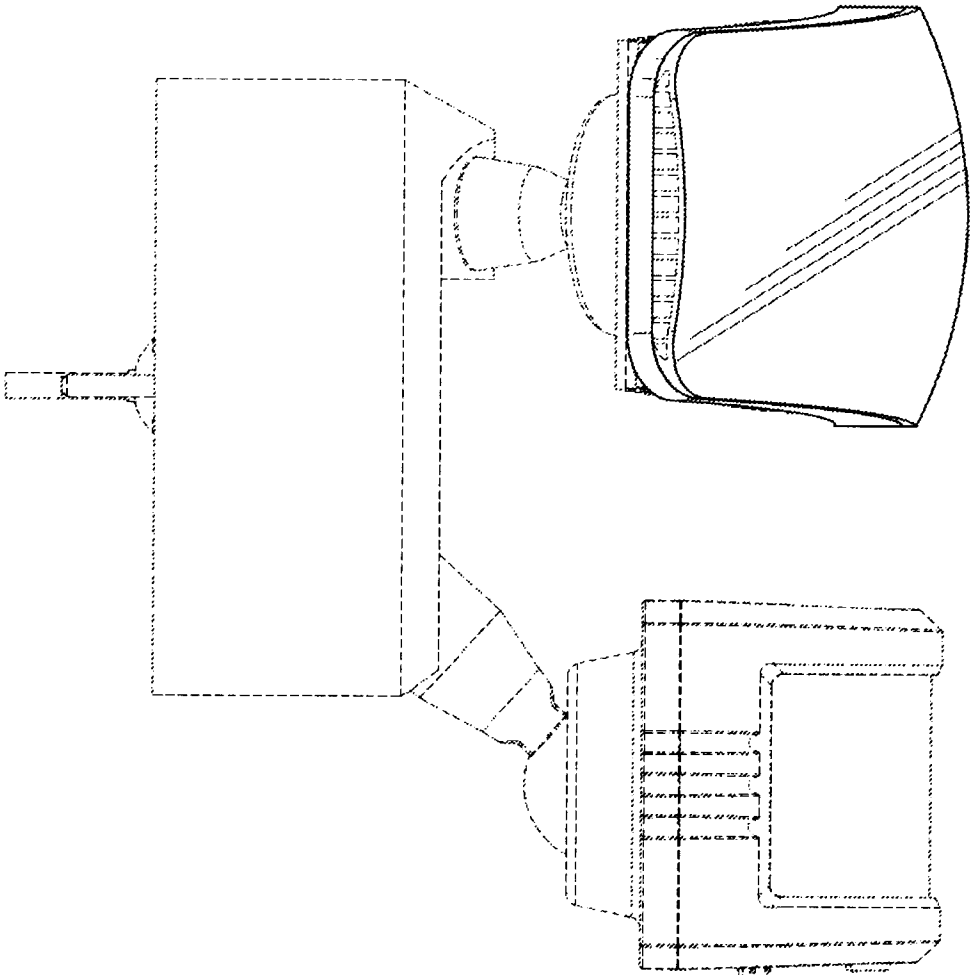
Figure 22:
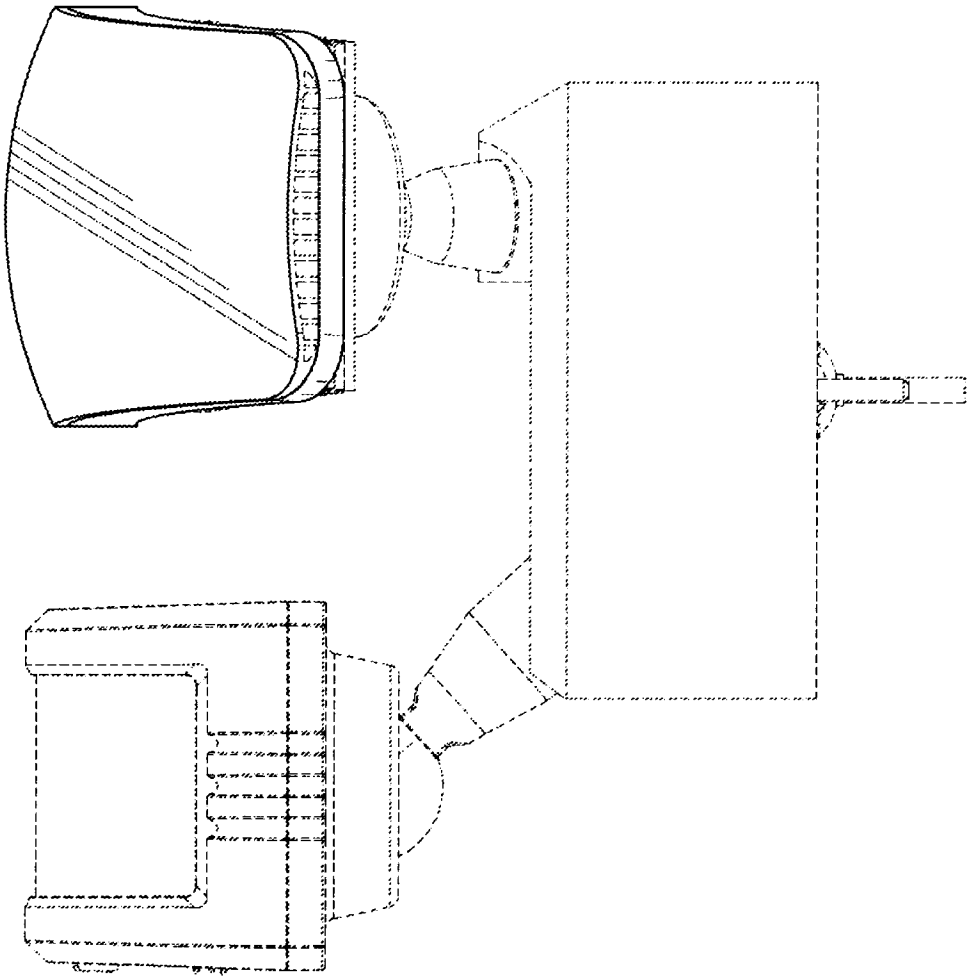
Figure 23:
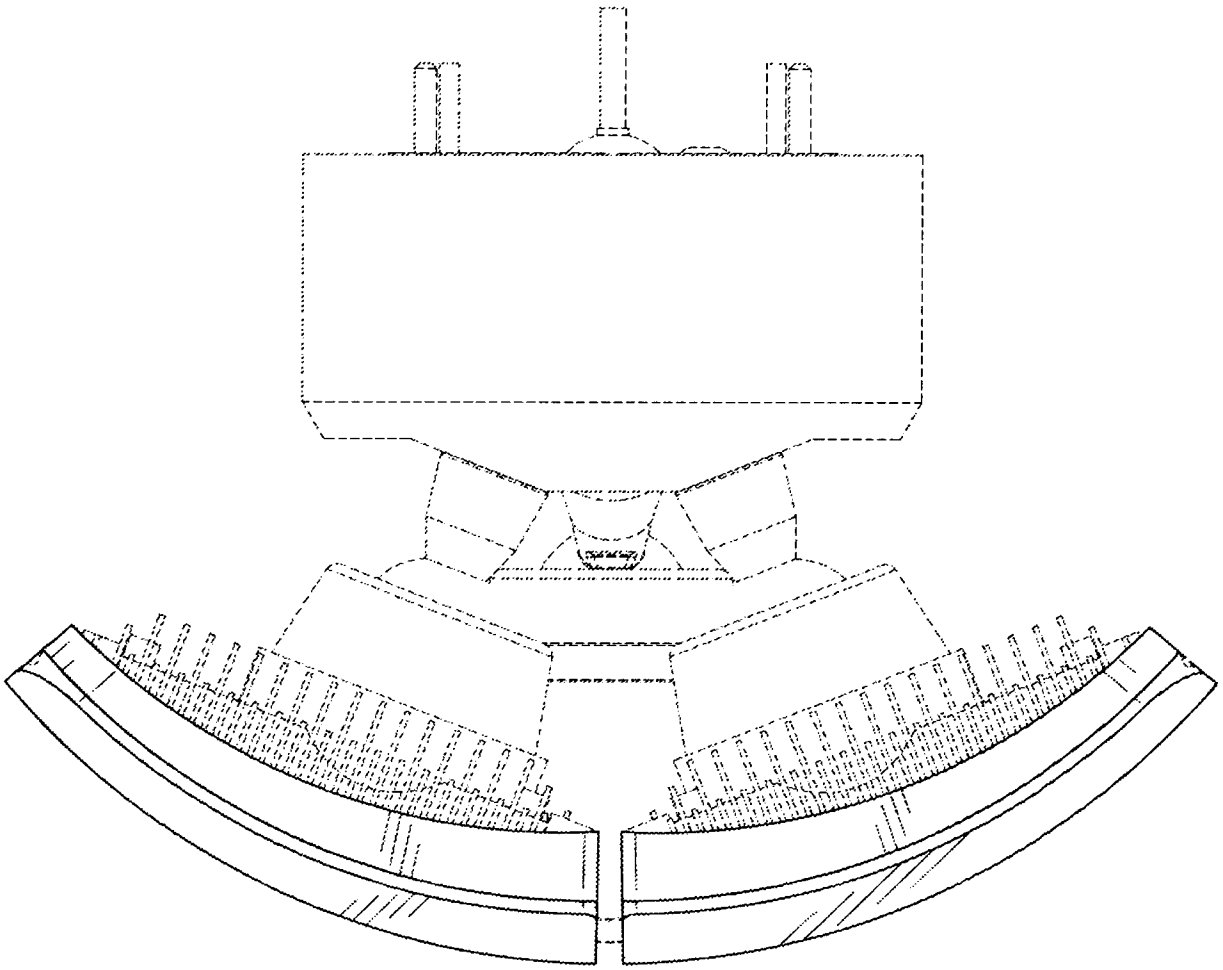
Figure 24:
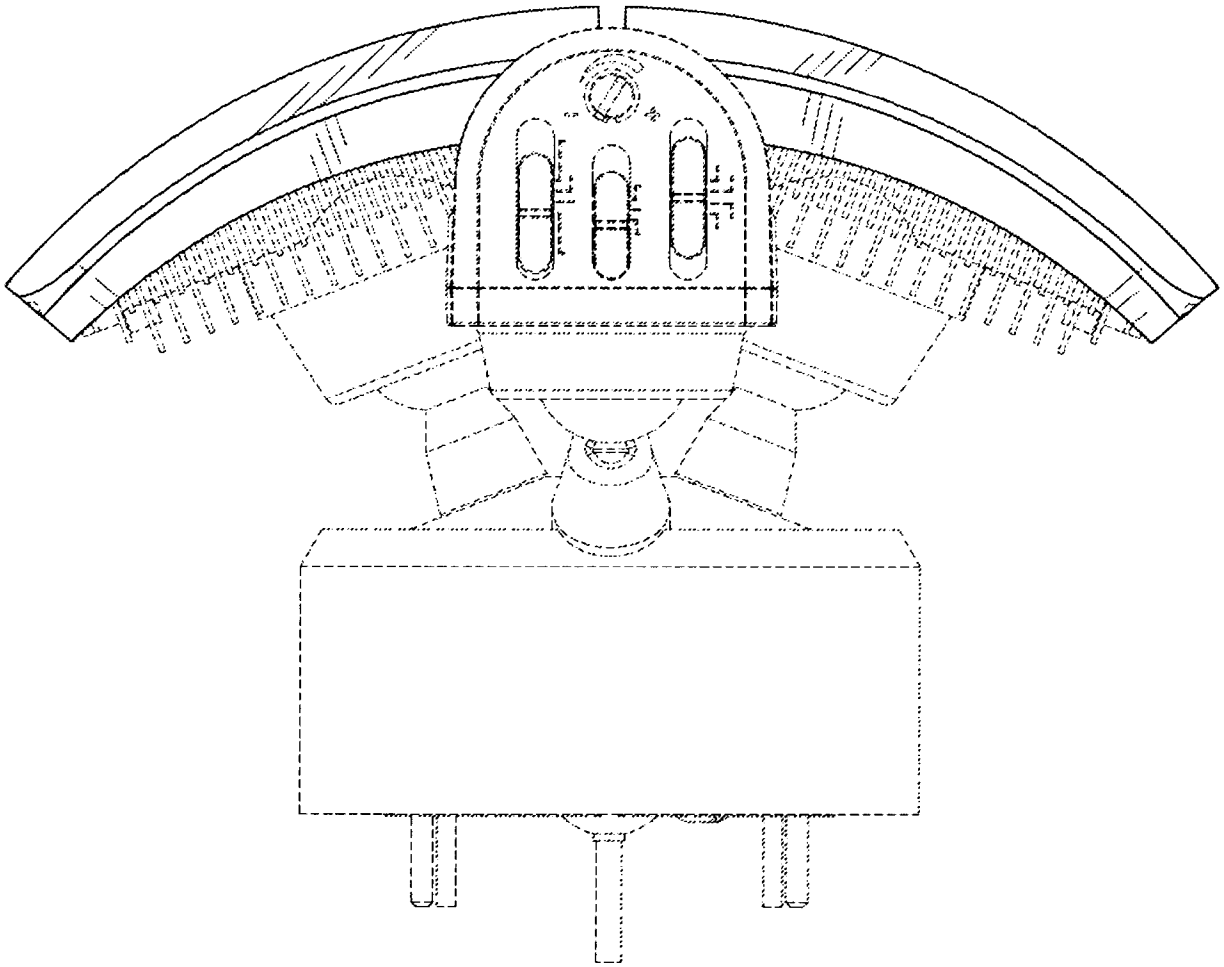

Matter enclosed in heavy brackets [ ] appears in the original patent but forms no part of this reissue; matter printed in italics indicates the additions made by reissue.

(58) Field of Classification Search
CPC .... F21S 8/04; F21S 8/00; F21V 21/00; F21V 17/02; F21V 14/02; F21V 21/30; F21V 21/14; F21V 21/26; F21W 2131/10; G03B 13/196; H04N 5/2251; H04N 5/2253; H04N 5/2254
See application file for complete search history.

(56) References Cited

U.S. PATENT DOCUMENTS

D269,210 S 5/1983 Cutlip
D336,756 S 6/1993 Meisner ..... D26/65
5,649,761 A * 7/1997 Sandell ..... F21V 23/0471 362/276
D385,370 S 10/1997 Moore
D386,801 S 11/1997 Orgovan
D386,802 S 11/1997 Kim ..... D10/109.2
5,726,706 A 3/1998 Walsh
D457,540 S 5/2002 Kieronski
D477,105 S 7/2003 Herst
D488,105 S 4/2004 Stahel
D499,823 S 12/2004 Reiss
7,168,821 B2 * 1/2007 Huang ..... G02C 11/04 24/3.1
D565,786 S 4/2008 Willmorth
7,448,779 B2 11/2008 Coushaine
D589,640 S 3/2009 Janssen
D591,444 S 4/2009 Beno
D595,447 S 6/2009 Purcell
D598,156 S 8/2009 Xiao
D599,049 S 8/2009 Guercio
7,714,243 B2 5/2010 Birdwell
D621,986 S 8/2010 Yan
D622,886 S 8/2010 Zheng
D633,646 S 3/2011 Marcaccio
D636,515 S 4/2011 Wang ..... D26/63
D641,097 S 7/2011 Kocks
D642,319 S 7/2011 Sprengers
D643,142 S 8/2011 Kocks
D647,236 S 10/2011 Chang
D649,198 S 11/2011 Mims
D656,267 S 3/2012 Laporte
D656,502 S 3/2012 Cacioppo
D670,022 S * 10/2012 Green ..... D26/128
D670,023 S * 10/2012 Green ..... D26/128
8,317,363 B2 * 11/2012 Zheng ..... F21S 8/033 362/231
D683,066 S 5/2013 Myung
D688,403 S 8/2013 Landefeld
D708,388 S * 7/2014 Lee ..... D26/120
D720,093 S * 12/2014 Lee ..... D26/120
D735,927 S 8/2015 Lee
D745,201 S * 12/2015 Lee ..... D26/63
D757,347 S * 5/2016 Chen ..... D26/120
D759,291 S * 6/2016 Chen ..... D26/120
D761,474 S * 7/2016 Chen ..... D26/65
D764,700 S * 8/2016 Chen ..... D26/118
D781,481 S * 3/2017 Chen ..... D26/65
D784,589 S * 4/2017 Chen ..... D26/65
D788,967 S * 6/2017 Chen ..... D26/65
D799,104 S * 10/2017 Chen ..... D26/120
D804,075 S * 11/2017 Fang ..... D26/65
D820,506 S * 6/2018 Chen ..... D26/120
D835,834 S * 12/2018 Paredes ..... D26/120
D866,057 S * 11/2019 Lafleur ..... D26/120

* cited by examiner

[CANCELED]

[CANCELED]

[CANCELED]

[CANCELED]

[CANCELED]

[CANCELED]

[CANCELED]

[CANCELED]

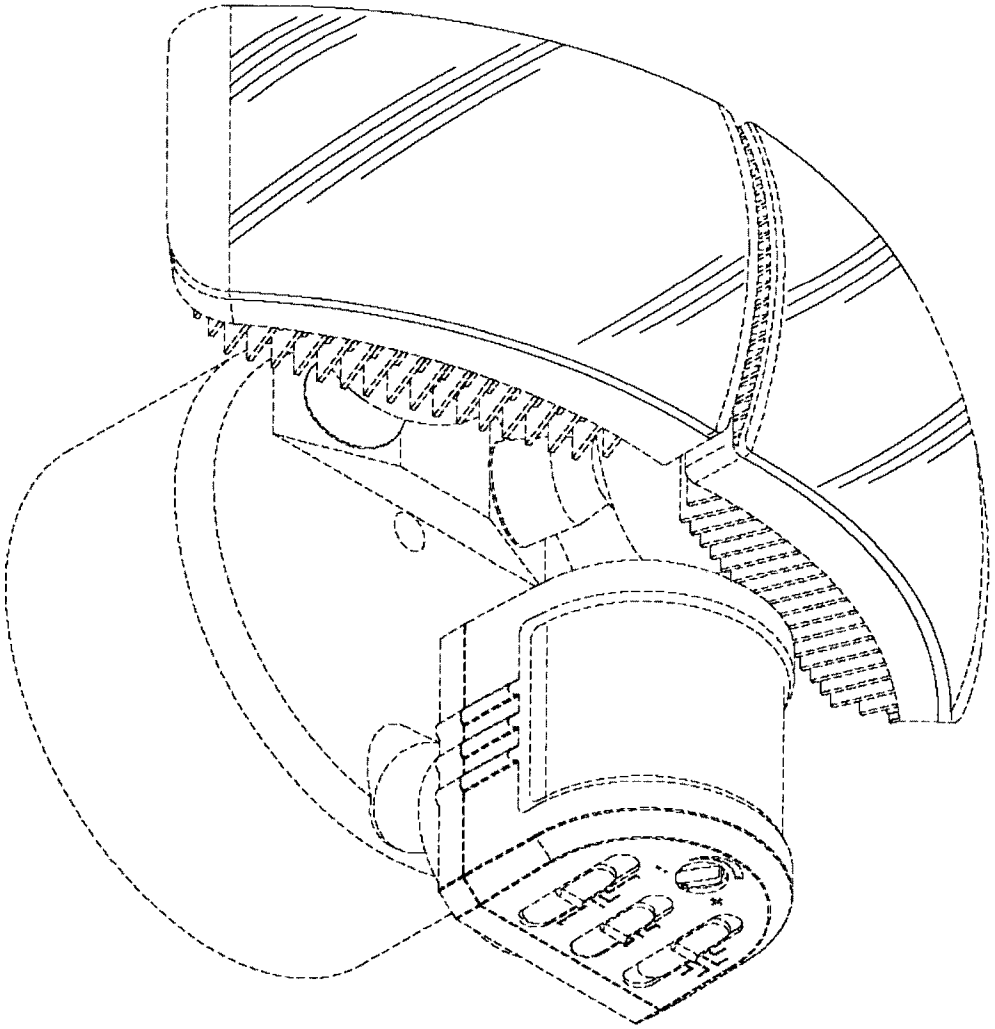
*FIG. 9*
[AMENDED]

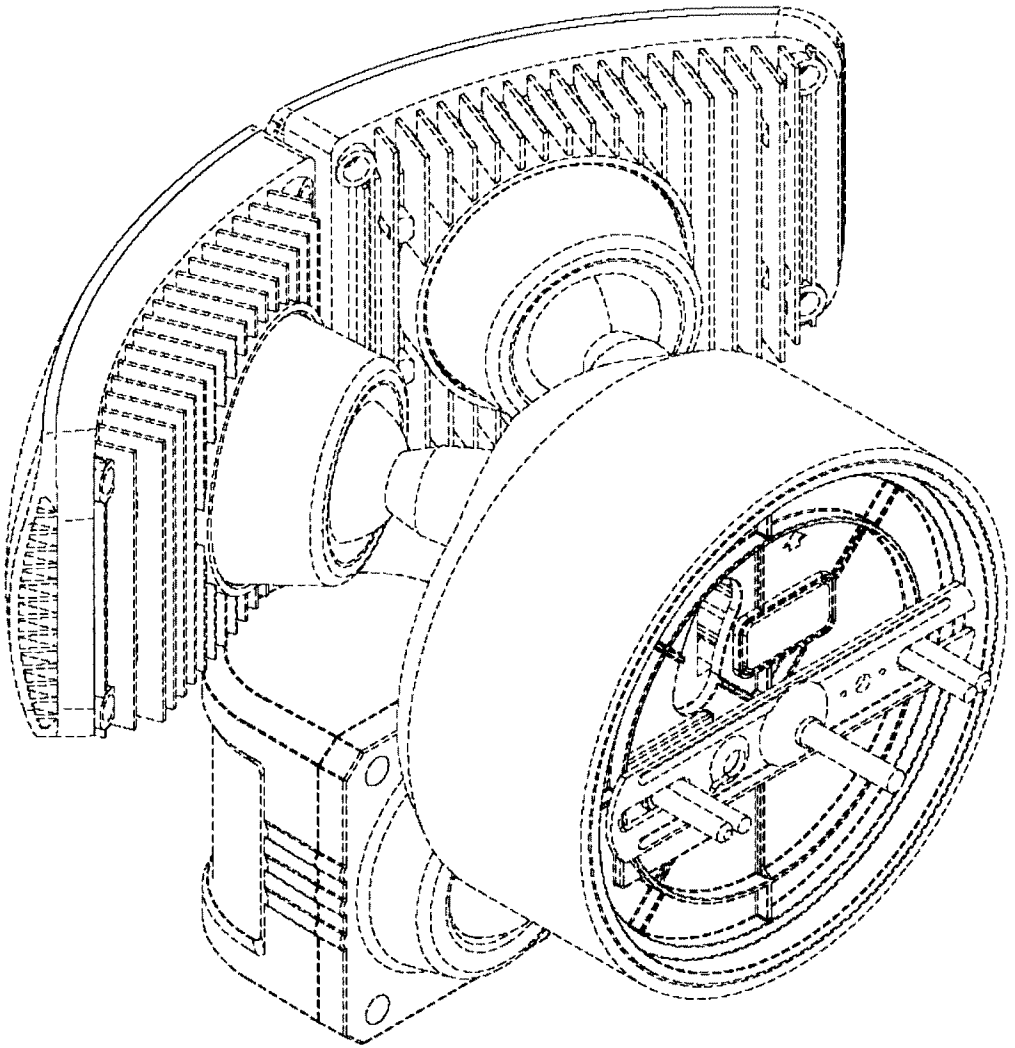
FIG. 10
[AMENDED]

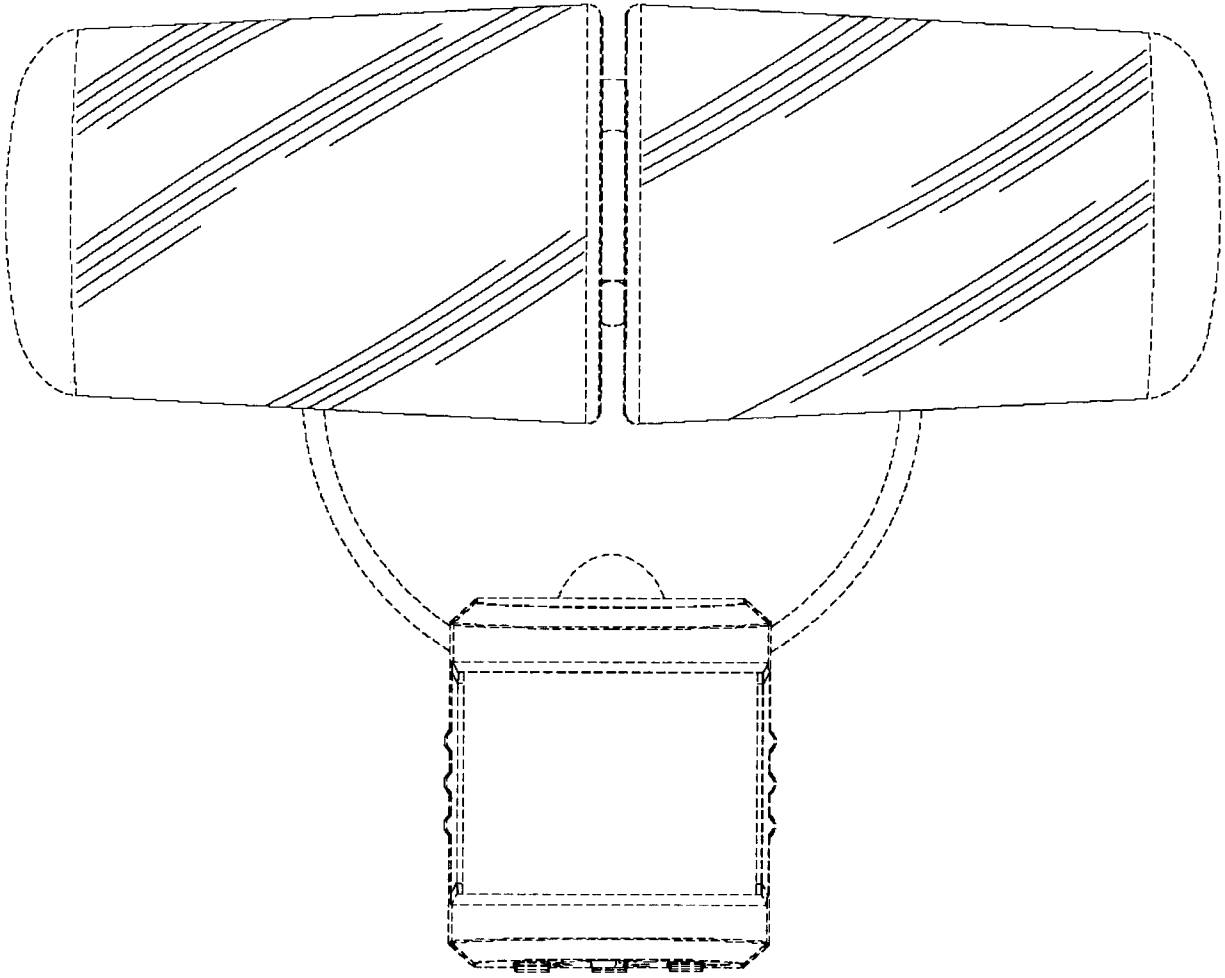
FIG. 11
[AMENDED]

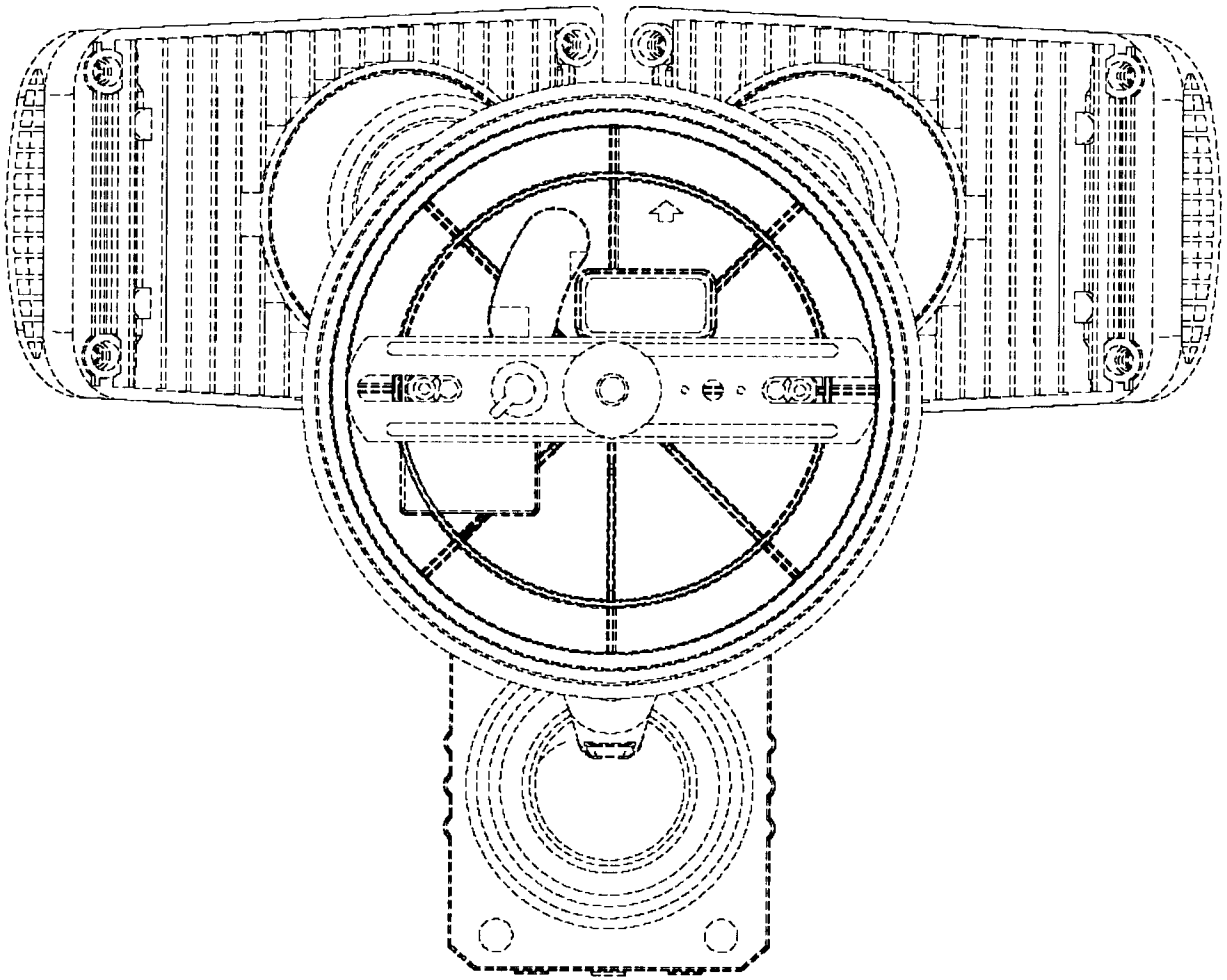
*FIG. 12*
[AMENDED]

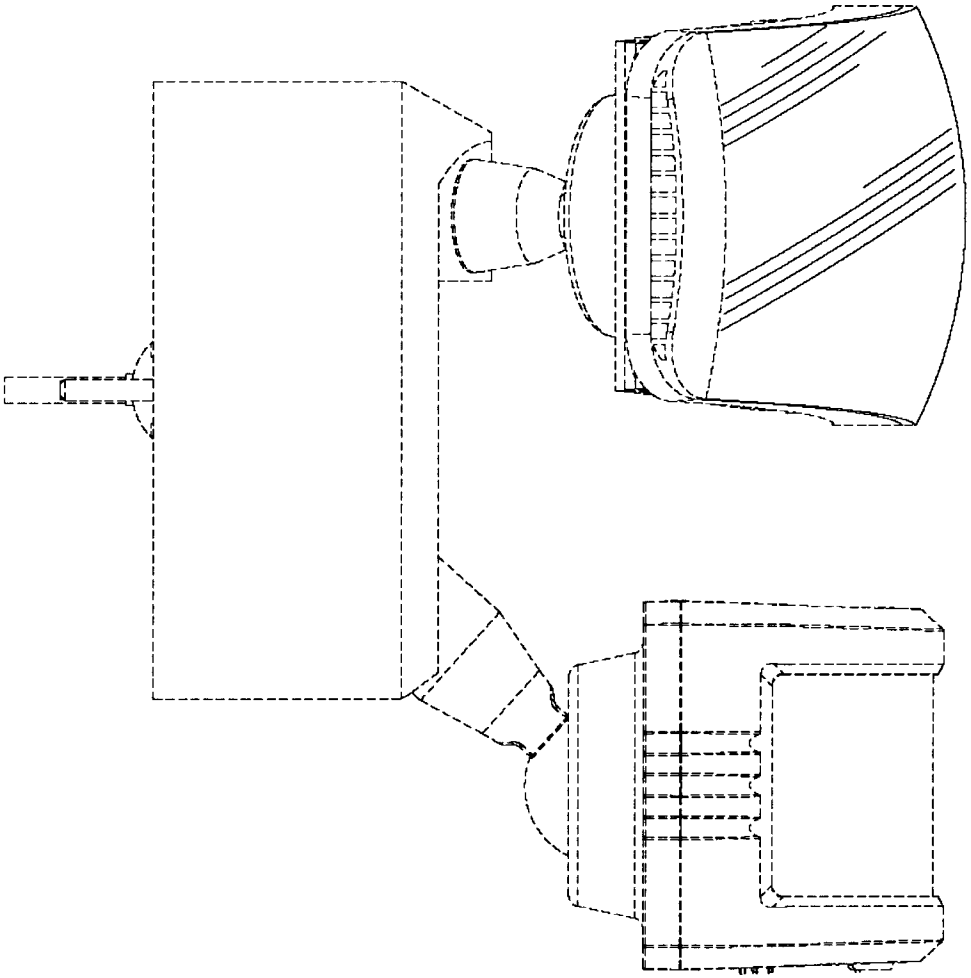
FIG. 13
[AMENDED]

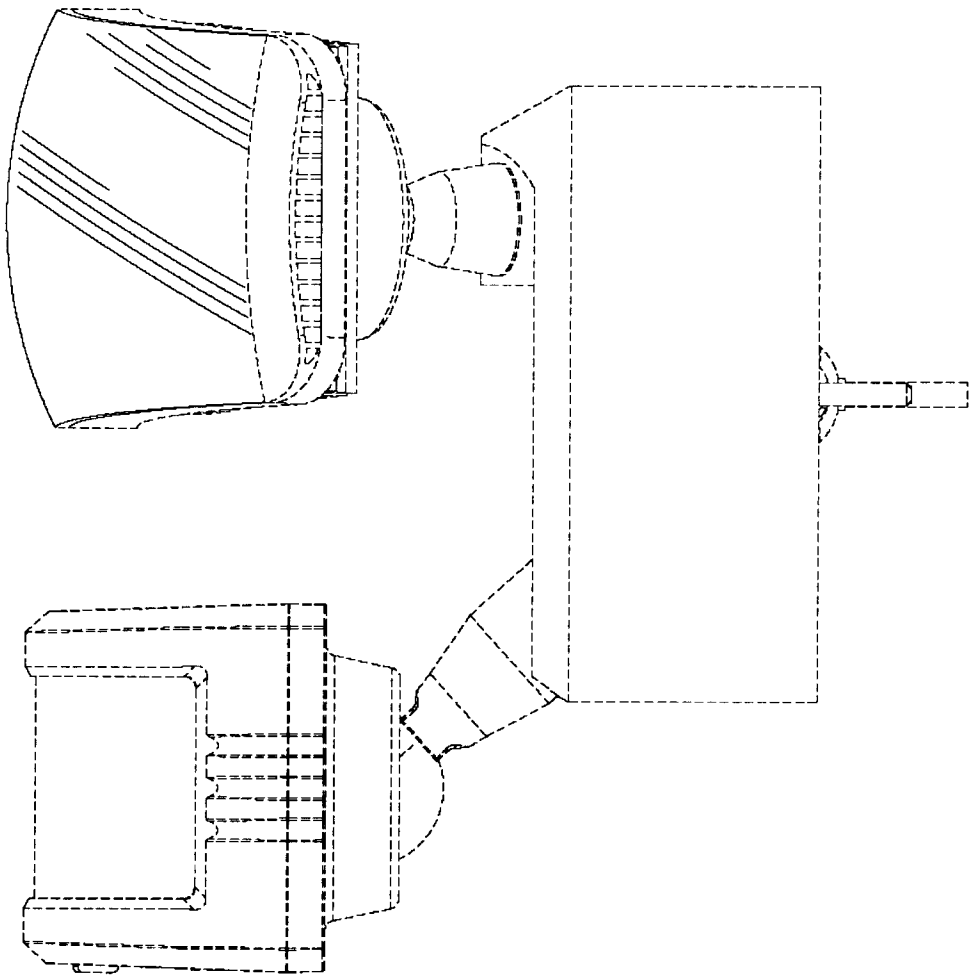
FIG. 14
[AMENDED]

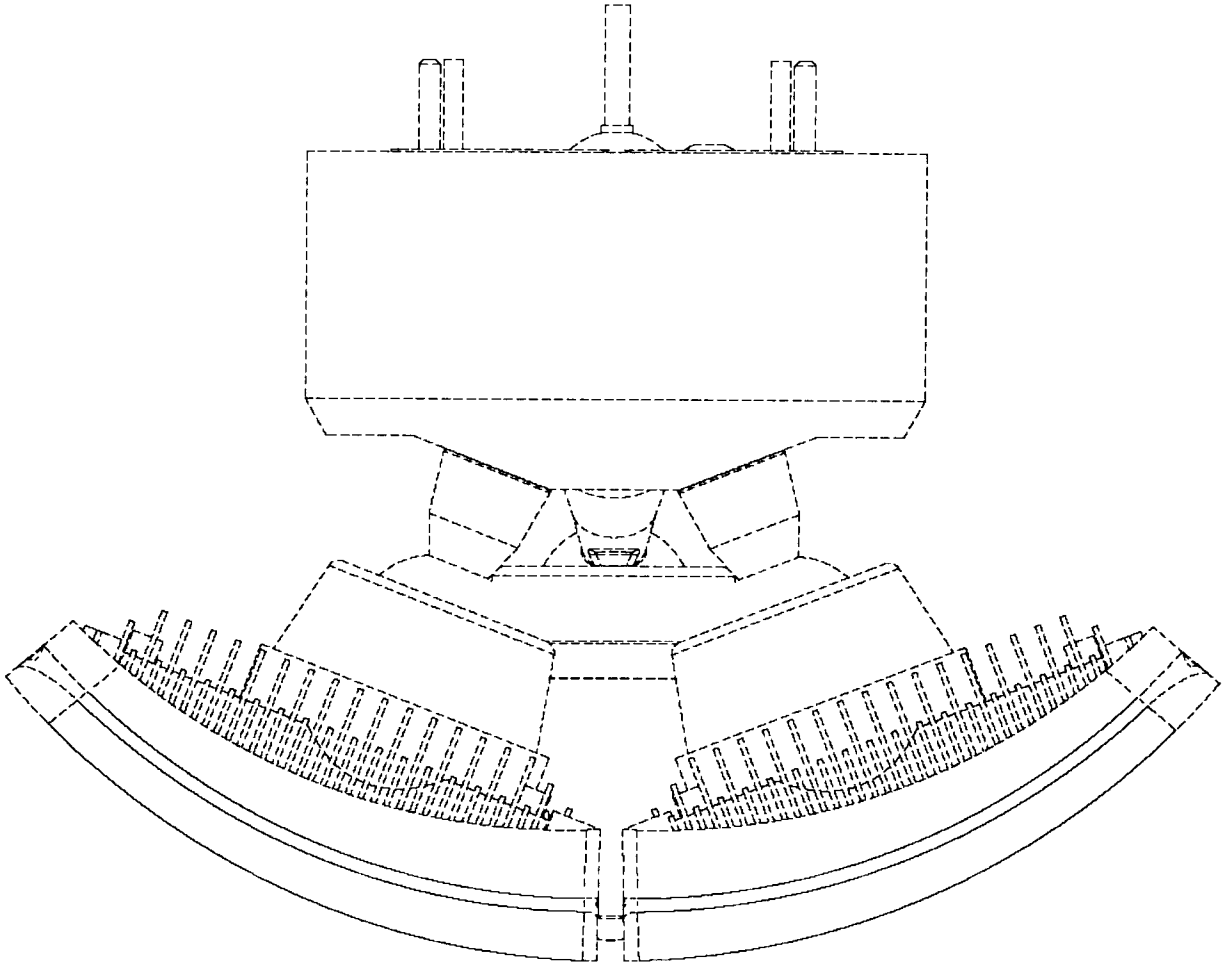
*FIG. 15*
[AMENDED]

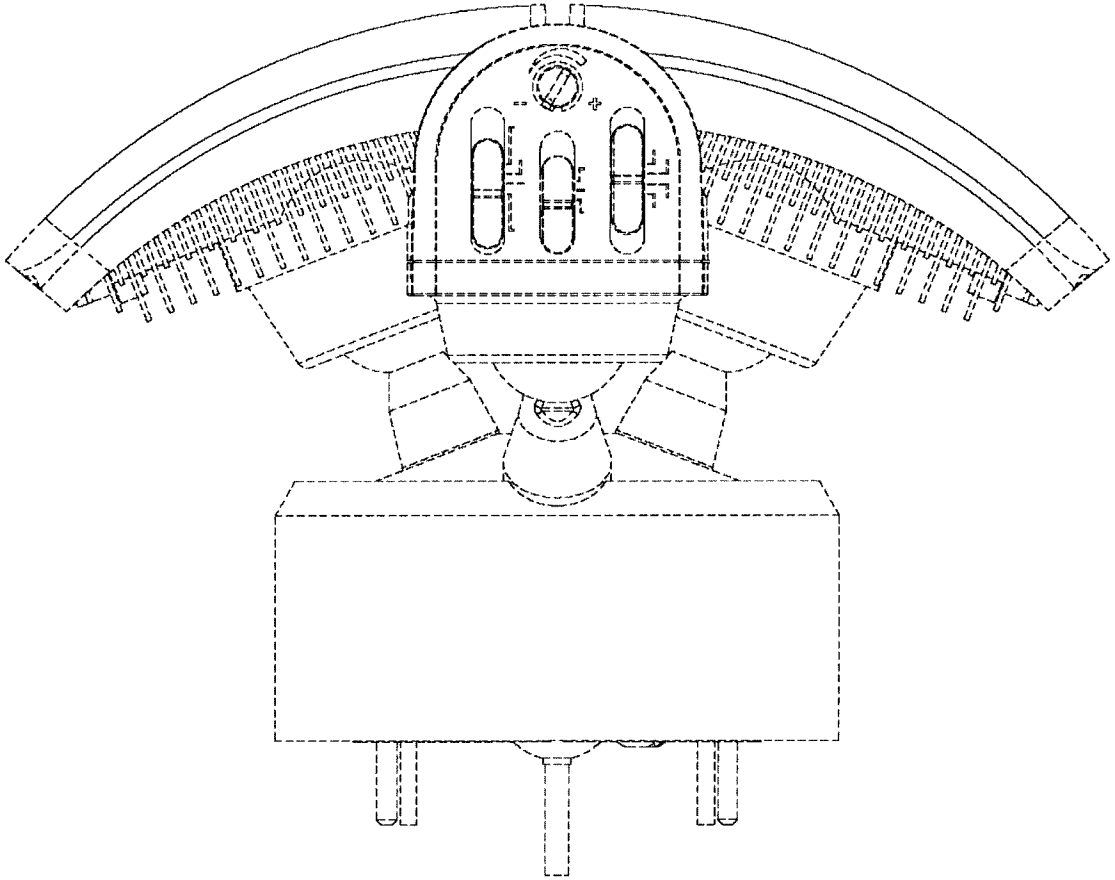
FIG. 16
[AMENDED]

[CANCELED]

[CANCELED]

[CANCELED]

[CANCELED]

[CANCELED]

[CANCELED]

[CANCELED]

[CANCELED]